United States Patent Office 2,753,703
Patented July 10, 1956

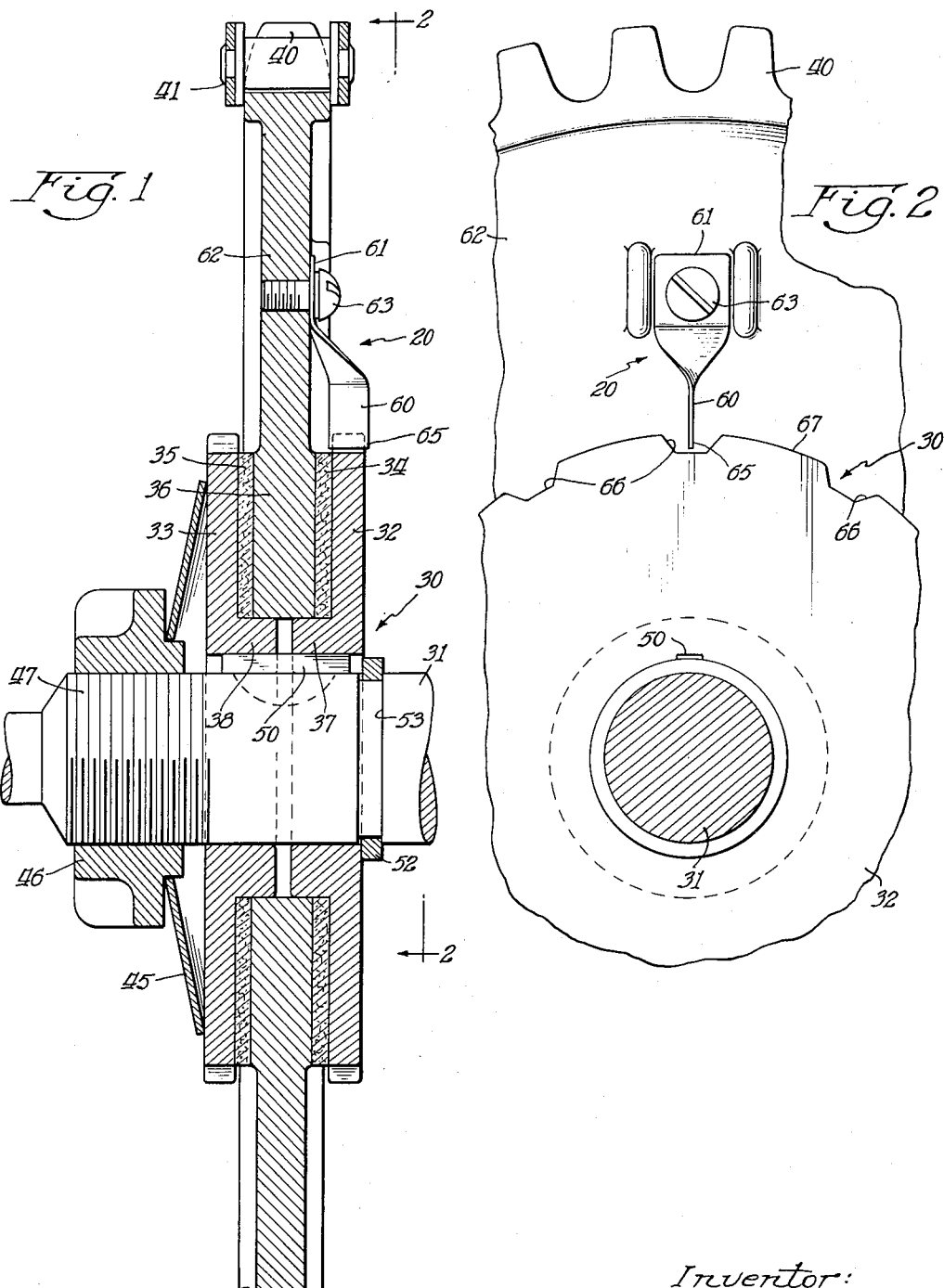

2,753,703

CLUTCH WITH SLIP INDICATING DEVICE

Elmer L. McIntyre, Detroit, Mich., assignor to Morse Chain Company, Ithaca, N. Y., a corporation of New York Application May 25, 1953, Serial No. 357,327

1 Claim. (Cl. 64—30)

This invention relates, in general, to drive torque limiting clutches and is particularly concerned with a mechanism for indicating slippage by sound as distinguished from visual means, said torque limiting clutch being adapted for advantageous employment as a means for transmitting power between two movable objects of a power transmission system, and said arrangement being particularly characterized by the provision of automatic means to prevent transmission of power above a certain predetermined torque load whereupon said sound indicating means contemplated by this invention will become operative.

Otherwise stated, the invention is embodied in a torque limiting clutch having incorporated therein a device for indicating by sound when the clutch is endeavoring to transmit torque above a predetermined load.

The present improvements in drive torque limiting devices are directed to simplify their construction and their mode of operation, and also to provide a torque limiting device which may readily and conveniently be employed universally to various power transmission arrangements, and particularly so where it is desired to transmit from a single power source full power to one or more mechanisms while transmitting limited power to one or more other mechanisms. Moreover, the present device seeks to employ safety means effective to warn an operator of the presence of torque loads of an amount above that contemplated for transmission through the associated drive torque limiting clutch.

The present device seeks to employ conventional parts wherever necessary and possible, thereby to effect a substantial reduction in the cost over prevailing types of drive torque limiting devices presently being employed.

Accordingly, an object and accomplishment of the invention is to provide a drive torque limiting device adaptable for advantageous employment in power transmission equipment where it is desired to limit the amount of power being transmitted, said device being provided with adjustable means to vary the limitation of transmission of power and including means for indicating by sound when such limits are reached.

Another object and accomplishment of the invention is to provide a sprocket with a so-called "Belleville" type washer, said sprocket having operatively associated therewith and arranged to operate in cooperation with the Belleville washer an adjustable means to effect varying degrees of tension so as to vary the pressures imparted by the Belleville washer upon friction facings associated with the sprocket, thereby to provide for limiting the power passing through the sprocket, and said sprocket having associated therewith mechanism for indicating by sound the limits of power passing through the sprocket.

A still further object and accomplishment of the invention is to provide an improved drive torque limiting clutch and clutch slip indicating means therefor by co-relating and especially designing the various elements thereof, whereby there shall be such cooperation between said improved elements as will best serve the purpose of providing an efficient drive torque limiting clutch including clutch slip indicating mechanism therefor capable of being manufactured at low cost and yet giving maximum of satisfactory service in use.

The invention seeks, as a further object and accomplishment, to provide a drive torque limiting device including clutch slip indicating mechanism therefor as contemplated herein and characterized by an arrangement of parts to more advantageously and satisfactorily perform the functions required of it and adapted to provide a compact unit which will successfully combine the factors of structural simplicity and durability and yet be economical to manufacture.

Additional objects, features and advantages of the invention disclosed herein will be apparent to persons skilled in the art after the construction and operation are understood from the within description.

It is preferred to accomplish the various objects of the invention and to practice the same in substantially the manner as hereinafter more fully described, and as more particularly pointed out in the appended claim.

Embodiments of this invention are shown on the accompanying drawings forming a part hereof and wherein:

Fig. 1 is a sectional view of a drive torque limiting clutch and the clutch slip indicating mechanism therefor contemplated by this invention and embodying the features thereof; and Fig. 2 is a front elevational view of the drive torque limiting clutch and clutch slip indicating mechanism therefor depicted in Fig. 1 and being taken substantially on the plane of the line 2—2 in Fig. 1.

The drawings are to be understood to be more or less of a schematic character for the purpose of illustrating and disclosing a typical or preferred form of the improvements contemplated herein and in the drawings like reference characters identify the same parts in the several views.

Attention is invited to Figs. 1 and 2 wherein the clutch slip indicating means is designated in its entirety by the numeral 20 and shown as being adjunctively employed to a torque limiting clutch device generally indicated in its entirety by the numeral 30.

In the exemplary embodiment of the invention, the drive torque limiting device 30 contemplated by the present invention comprises, in general, a shaft 31 having mounted thereupon a pair of pressure plates 32 and 33 respectively having friction surfaces 34 and 35 which have operatively disposed therebetween a sprocket member 36 which is free to rotate upon flange portions 37 and 38 of the pressure plates 32 and 33 under certain circumstances, said sprocket member 36 being provided with sprocket teeth formations 40 arranged to carry a suitable chain drive 41, and a Belleville spring type washer 45 arranged to cooperate with the pressure plate 33 having the friction surfaces 35 to provide a selected pressure to the pressure plates, said selected pressure being manually adjustable by means of the collar 46 carried by the shaft 31 and arranged on threaded formations 47 whereby the collar may be rotated to effect movement thereof axially of the shaft 31 in order to provide varying pressure upon the Belleville spring type washer 45.

It is obvious that the drive through the drive torque limiting device 30 may be accomplished in one of two ways, that is to say, the driving force may be transmitted through the shaft 31 and be passed through the drive torque limiting device 30 and transmitted to the sprocket member 36 and thereafter to the chain 41, or, the drive may start in reverse direction from the chain to the sprocket member 36, to the pressure plates and thereafter to the shaft 31. In either case, it is obvious that torque will only be transmitted through the drive torque limiting device 30 so long as the torque is within the range permitted by the pressure by the Belleville spring type washer, which as hereinbefore described, is adjustable by means of the axial movement of the collar 46. It is obvious that since the torque limiting device 30 has a single sprocket member 36 a chain of the type which may be suitably arranged to receive the sprocket teeth formations thereof is all that is necessary.

The pressure plates 32 and 33 are respectively keyed to the shaft 31 by means of a fitted key 50 but are permitted limited movement axially of the shaft 31 in order to accommodate the respective position of the sprocket member 36 and to accommodate for wear of the friction surfaces 34 and 35.

In order to prevent axial movement of the pressure plate 32 to the right as shown in Fig. 1, there is provided a snap ring 52 disposed in a groove 53 in the shaft 31, said pressure plate 32 being adapted for engagement with portions of said snap ring 52 to restrict movement of the pressure plate in this one direction but permitting axial movement of the pressure plate 32 in the other direction.

It is notable that the sprocket member 36 is free to rotate upon the flange portions 37 and 38 of the pressure plates 32 and 33 only when the driving torque is of such magnitude as to overcome the pressure applied to the pressure plates by the Belleville spring type washer 45. In normal operation, within the driving torque limitations, the pressure plates will grip the sprocket member 36, thereby to provide driving torque within a contemplated range.

Particular attention is now invited to the clutch slip indicating means 20 which is an important feature of the present invention. In the event that there exists driving torque over and above the contemplated range, the clutch will begin to slip and it is of particular advantage for the operator to have knowledge of this situation.

The clutch slip indicating mechanism contemplated by this invention comprises a metallic resilient spring-like finger 60 having one end 61 thereof secured to the web 62 of the sprocket member 36 by means of a screw 63 while the other end portions 65 project radially downwardly for receipt into a groove 66 disposed on the periphery of the pressure plate 32. It is noted that the end 61 of the finger is generally flat and is parallel to the corresponding surface of the sprocket 62, while the end portion 65 of the finger is offset and rotated at an angle of approximately 90° with respect to the plane of the portion 61. This is the normal operative position; however, in the event that there is relative rotation between the pressure plate 32 and the sprocket member 36, the end portions 65 of the resilient spring-like finger will become engaged with the peripheral surface 67 of the pressure plate 32 and fall into the other grooves as at 66 on the periphery of the pressure plate 32 thereby providing a clicking sound warning the operator that overload conditions exist and that the clutch is slipping. It is particularly notable that the clutch slip indicating means warns of overload conditions by sound as distinguished from other visual means such as a light or other indicating device. Sound more advantageously attracts the attention of the operator than other visual indicating means.

From the foregoing disclosure, it may be seen that I have provided an improved drive torque limiting device including a clutch slip indicating means therefor which efficiently fulfills the objects thereof as hereinbefore set forth and which provides numerous advantages which may be summarized as follows:

1. Structurally simple, efficient and durable;
2. Economical to manufacture and readily adaptable to mass production manufacturing principles; and
3. The provision of a drive torque limiting device adaptable for advantageous employment in power transmission equipment where it is desired to limit the amount of power being transmitted, said device being provided with adjustable means to vary the limitation of transmission of power and including means for indicating by sound when such limitations are reached.

While I have illustrated preferred embodiments of my invention, many modifications may be made without departing from the spirit of my invention, and I do not wish to be limited to the precise details of construction set forth, but wish to avail myself of all changes within the scope of the appended claim:

I claim:

In a torque limiting clutch including a sprocket encircling a shaft, a pair of pressure plates keyed to the shaft and axially moveable thereon, at least one of said plates having grooves formed in the periphery thereof and defining circumferentially spaced lands and both plates being adapted to rotatably support and frictionally engage the sprocket in cooperation with and responsive to pressure exerted by a Belleville washer, said washer bieng so adjusted that in the normal operation of the clutch, the sprocket and the shaft are capable of transmitting torque, while an effort to transmit torque through the clutch in excess of a predetermined value will permit relative rotation between the plates and the sprocket, the combination with said sprocket and pressure plates of a sound device for signalling the occurrence of said relative rotation comprising: a radially extending metallic resilient finger rigidly mounted upon the sprocket and engageable with the grooves, said finger having a generally flat first portion secured to the surface on one side of said sprocket adjacent said one plate and having a radially inwardly extending offset portion disposed at an angle of generally 90° to said first portion and received within one of said grooves, said finger being operable to flex to engage successive lands and grooves to generate a clicking sound whenever said relative rotation occurs.

References Cited in the file of this patent
UNITED STATES PATENTS

| | | |
|---|---|---|
| 1,596,132 | Waite | Aug. 17, 1926 |
| 1,693,140 | Dietze | Nov. 27, 1928 |
| 2,525,379 | Smilansky | Oct. 10, 1950 |
| 2,597,514 | Nash | May 20, 1952 |
| 2,659,220 | Cherry | Nov. 17, 1953 |